Oct. 31, 1961    B. W. SEWELL    3,006,203
RADAR SCANNING NUTATOR
Filed Sept. 20, 1948    4 Sheets-Sheet 2

Inventor:
BEN W. SEWELL
By
Attorney

Inventor:
BEN W. SEWELL

Oct. 31, 1961　　　B. W. SEWELL　　　3,006,203
RADAR SCANNING NUTATOR
Filed Sept. 20, 1948　　　　　　　　　　　　4 Sheets-Sheet 4
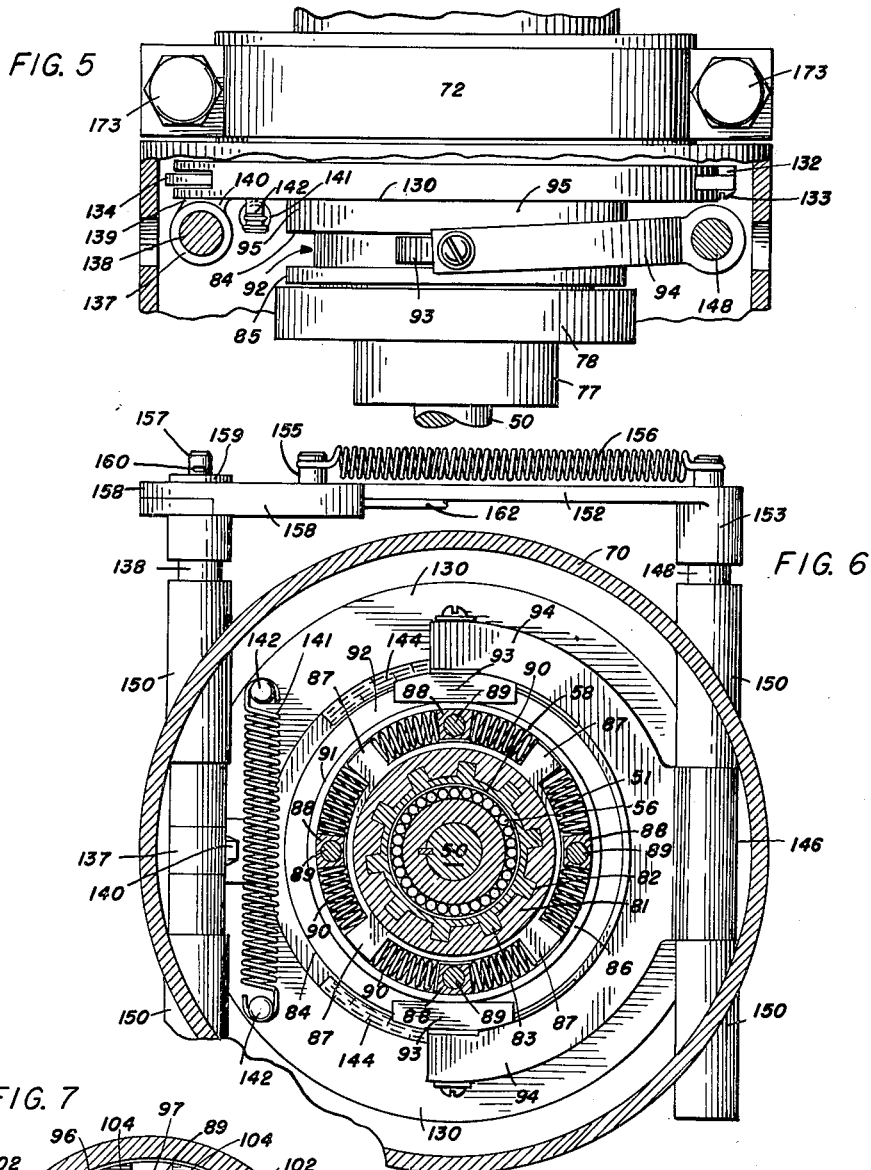
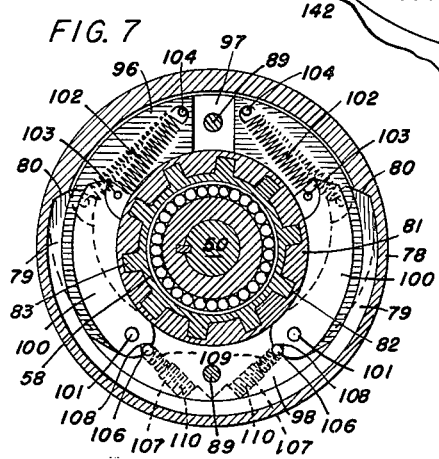
Inventor:
BEN W. SEWELL

United States Patent Office 3,006,203
Patented Oct. 31, 1961

3,006,203
RADAR SCANNING NUTATOR
Ben W. Sewell, Tulsa, Okla., assignor, by mesne assignments, to the United States of America as represented by the Secretary of the Navy
Filed Sept. 20, 1948, Ser. No. 50,148
15 Claims. (Cl. 74—86)

This invention relates in general to a mechanical scanning device which may be shifted rapidly to follow either a circular or an elliptical scan.

Separate scanning devices for obtaining an elliptical or a circular scan have been produced and used for some time, but the present invention provides a unitary mechanism for obtaining either movement by simply changing over from one to the other. This makes it convenient to proceed generally with a wider elliptical scan and to concentrate with a more limited circular scan. It is a considerable advantage to be able to change over rapidly from one movement to the other without delay and without using two or more separate machines.

An important object of the invention is to provide a mechanical scanning nutator which may be shifted to follow either an elliptical or a circular scan at will.

A further object of the invention is to provide a scanning nutator for elliptical and circular movement which may be shifted rapidly from one to the other while the unit is in operation.

A still further object of the invention is to provide a scanning nutator for elliptical and circular scans which may be shifted rapidly from one to the other and cushioned to absorb the shock of shifting.

Other objects of the invention will appear in the specification and will be apparent from the accompanying drawings, in which, FIG. 1 is a plan view of a scanning nutator in accordance with this invention and showing a wave guide and other parts in section;

FIG. 5 is a side elevation of the clutch assembly;

FIG. 6 is a cross sectional view taken on the line 6—6 of FIG. 2; and

FIG. 7 is a cross sectional view taken on the line 7—7 of FIG. 2.

Figure 1:
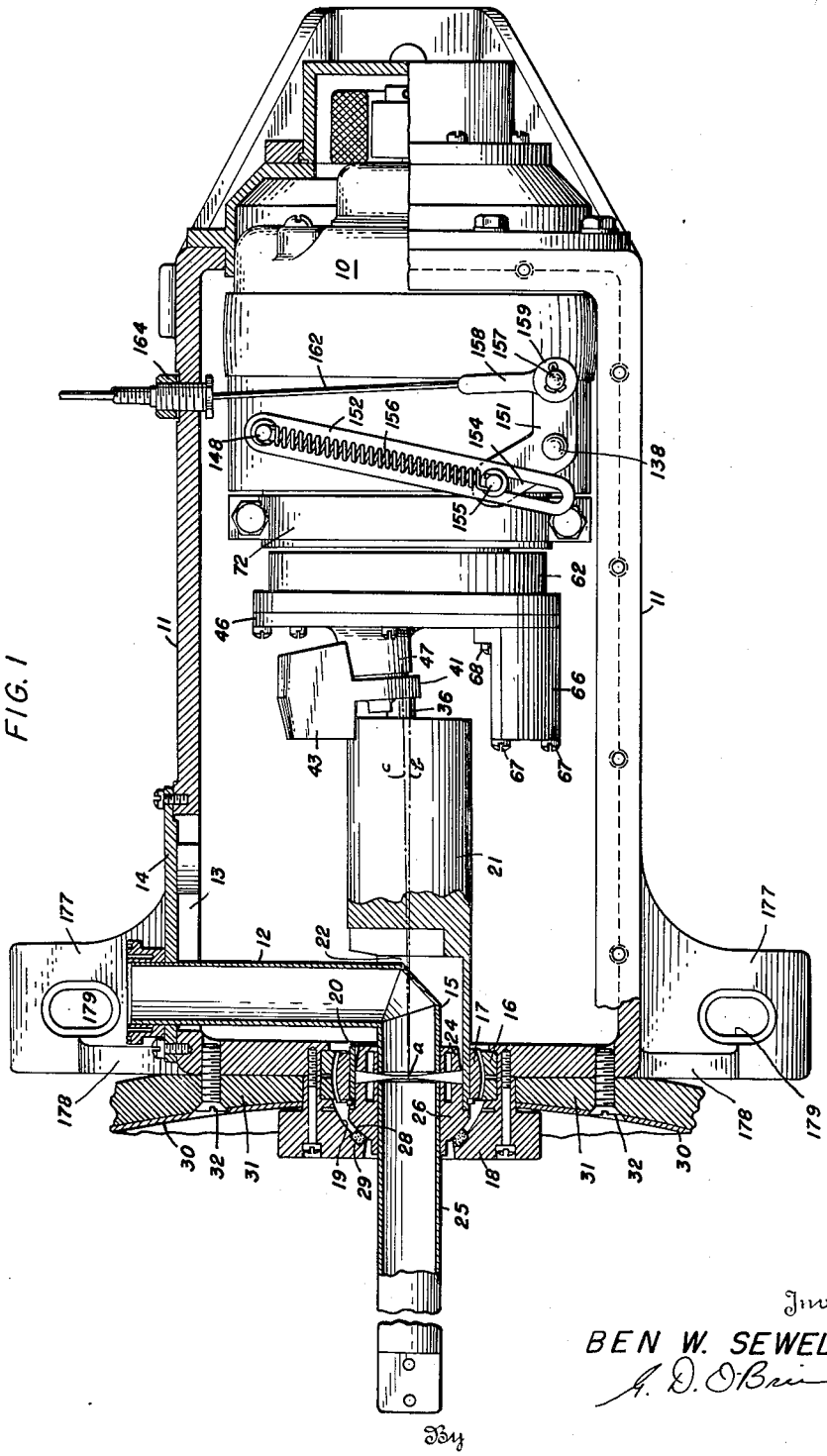

The invention is described in connection with a motor 10 mounted in one end of a casing 11, and a wave guide mounted at the other end of the casing. The wave guide comprises a tube section 12 with its outer end secured in a side opening 13 of the casing by a plate 14 removably attached to the outside of the casing, the tube section having an angular end 15 freely centered in a spherical bearing at the end of the casing.

In the spherical bearing are sperical race members 16 and 17, the outer member 16 attached to the casing end by a gland block 18 with an inner spherical surface 19, and the inner member 17 attached to the outside of a hollow shell 20 at the end of the antenna feed assembly 21. This end of the shell 20 has a lateral opening 22 for inserting the angular end 15 of the wave tube section centrally within the shell 20. A centering collar 24 may be secured to the outside of this extremity of the angular end 15, beveled inwardly from the outer edge of the collar to permit a limited angular movement of the shell 20 relative to the collar.

A wave tube section 25 is attached to the inside of the shell 20 at its outer end by means of a tight fitting collar 26 which has a part spherical outer surface 28 which conforms to but is spaced from the inner spherical surface 19 of the supporting gland block 18. Holding these surfaces in spaced relation is a contact ring 29 seated in a groove in the gland block 18. The adjacent end surfaces of the collars 24 and 26 are beveled apart outwardly all around from a central point a which represents the center of the spherical bearing about which the antenna feed assembly 21 and the outer wave tube section 25 have limited movement.

At the outside of the end of the casing 11 and surrounding the gland block 18 is a reflector 30 and a backing 31 therefor attached to the casing by screws 32. This reflector is usually parabolic and the outer end of the wave tube section 25 is located approximately at the focus thereof so that movements of the antenna feed assembly will produce the least variation from the focus.

At the inner end of the antenna feed assembly 21 is an axial recess 35 for receiving one end of a shaft 36 mounted on ball bearings 37 and this assembly is held therein by a spring ring 38 seated in a groove 39. At its outer end the shaft 36 is connected by a cross pin 40 with one end of an arm 41 secured intermediate its ends to one end of a mounting shaft 42 and having a counter weight 43 at its other end. The shaft 42 is mounted in roller bearings 44 and 45 in an inclined hollow boss 47 in a plate 46 and has a bevelled spur gear 48 attached at its other end.

Projecting inwardly from the motor 10 is a driving shaft 50 upon which a bearing support 51 is connected by a key 52. At the outer end of the support is an eccentric projection 54 to which the plate 46 is secured by screws 55. Mounted on the bearing support 51 by roller bearings 56 is an operating sleeve 58 having a projecting flange 59 to which an internal ring gear 60 is secured by screws 61. This gear is inclined to engage the correspondingly beveled spur gear 48 in the inclined boss 47 with a driving ratio of two to one.

Extending over the ring gear 60 and its supporting flange 59 from the marginal edge of the plate 46 is an enclosing housing 62 having a circular web 63 extending inwardly around the end of the sleeve 58 with a packing ring 64 seated in a groove 65 and engaging the adjacent face of the flange 59. With this construction the plate 46 is driven continuously with the motor 10, and the ring gear 60 may be driven with the shaft 50 and with the plate 46 or it may be held against movement, causing the bevelled spur gear 48 to walk around the inside of the ring gear 60 and to correspondingly rotate the shaft 42 and the weighted arm 41.

As the weighted arm 41 is mounted eccentrically upon the plate 46 a counterweight 66 is secured to the opposite marginal edge of the plate by screws 67 and 68. The weight 43 on the arm of the arm 41 will swing around the end of the feed assembly 21 and within the counterweight 66 when it is rotated relatively to the plate 46.

The axis of the driving shaft 50 and the center of the spherical bearing 16, 17 are in alignment, but the oscillation shaft 36 is so connected to the weighted arm 41 that this end of the feed assembly 21 is slightly eccentric to this line. This causes the feed assembly to be rotated in a circular path when the spur gear 48 and the arm 41 are rotated with the plate 46, and in an elliptical path when the ring gear 60 is held and the arm 41 is rotated relatively to the plate 46 as the plate is rotated by the motor 10. The elliptical path may be relatively large compared with the circular path, resulting in radar scanning paths of corresponding dimensions by the relative oscillations of the radar feed assembly 21.

The clutch and brake mechanism for holding or freeing the ring gear 60 is located about the sleeve 58 and is located in a housing 70 formed as a continuation or extension of a motor housing 71. It comprises an end bearing ring 72 having ball bearings 73 surrounding and supporting the operating sleeve 58 outwardly from the end of the shaft 50, and an end plate 74 also surrounding the sleeve and held against rotation in the housing by a dowel pin 75. This end plate 74 has an arcuate projection 76 extending only partially around and adjacent the sleeve 58 constituting a stop engaged by the brake when it is moved in this direction for preventing rotation of the operating sleeve.

In the other direction, the clutch is limited in its movement by a collar 77 secured to the bearing support 51 by a key 78', and therefore rotatable with the driving shaft 50. Extending outwardly from the collar 77 is a circular web with a flange 78 turned inwardly to overlie a portion of the clutch. At the inside of the flange is a groove 79 (FIGS. 2 and 7) extending partially around it to provide inclined stops 80 engaged when the clutch is moved toward the flange.

The clutch assembly is in the form of a composite grooved collar having a splined sleeve 81 with longitudinal inner grooves 82 and slidably movable upon corresponding outer ribs 83 of the operating sleeve 58. Fitting tightly but rotatably upon the spline sleeve 81 are disks 84 and 85 spaced apart at their inner peripheries by a shouldered enlargement 86 on the sleeve 81. Projecting from the sleeve at equal distances apart and between the disks 84 and 85 are projections 87 with opposite radial contact faces, and connecting the disks at correspondingly equal distance apart between the projections 87 are blocks 88 with opposite radial contact faces secured to the disks by cross pins 89. Interposed between the radial faces of the blocks 88 and projections 87 are coil springs 90 tending to press them apart and thus to hold the spaced disks 84 and 85 for limited compressive movement in either rotary direction with respect to the sleeve 81.

Between the disks 84 and 85 is a ring 91 which extends over the outer ends of the projections 87 and blocks 88 and forms a cover for retaining the coil springs 90 in place. At the outside of the ring and between the disks 84 and 85 is a circular space forming a groove 92 for receiving opposite feet 93 at the ends of a shifting yoke 94.

A flat ring 96 is secured to one of the disks 85 at the outer side (FIGS. 2 and 7) adjacent the collar 77 by opposite cross pins 89 and the ring and the disk are spaced apart by opposite blocks 97 and 98 through which the pins extend. Two curved dogs 100 are each pivoted at one end upon a pin 101 connected to the ring and the disk to swing outwardly at the other end beyond the outer peripheries of the ring and the disk, to extend into the groove 79, and to engage the corresponding stop 80. These dogs are swung outwardly by centrifugal force and are returned to inner position against the sleeve 81 by coil springs 102 each connected at one end to a perforated ear 103 of the dog and at the other end to a pin 104 fixed to the ring or the disk.

To retain each dog at its inner position a ball 106 mounted in a bore 107 extending in the block 98 is pressed into engagement with an angular notch 108 in the edge of the dog by a coil spring 109 held against the ball and adjusted in tension by a screw 110 threaded into the bore 107. As the rotative speed of the clutch assembly is accelerated, the dogs will fly outwardly depending upon the spring tension on the balls 106, and when the speed is decreased, the springs 102 return the dogs to the inner position where they are again engaged by the spring pressed balls 106.

As the collar 77 is rotating at full motor speed when the clutch assembly is shifted into the circle scan position, and the clutch assembly must build up its speed until it reaches that of the collar, restraining the centrifugally operated dogs permits the speed of the clutch assembly to approach that of the collar before the dogs are actually released to engage the collar, thus reducing the shock which is taken up in part by the springs 90.

The other clutch disk 84 has an integral laterally extending outer flange 111 to enclose a segmental filler block 112 and a flat outer ring 114 flush at the outer face with the edge of the flange and all secured together by opposite cross pins 89. In an opening 116 in the block a dog 117 is mounted at one end on a pivot 118 to swing by centrifugal force outwardly in the opening. At the free end of the dog is an inward sharp tooth 119 adapted to project inwardly beyond the inner periphery of the ring 114 to engage the end of the arcuate stop projection 76 which extends from the end plate 74.

A coil spring 120 is connected at one end to a pin 121 at the free end of the dog 117 and at the other end to a pin 122 projecting from the plate 114. In its innermost stop engaging position the dog is restrained by a ball 124 seated in a bore 125 extending inwardly from the periphery of the block 112 and held in releasable engagement with a notch 126 in the edge of the dog by a coil spring 127 pressed inwardly by a screw 128 threaded adjustably into the bore. The dog holds the clutch assembly against movement when the stop projection 76 is engaged and assumes and holds this position during low speed, but swings outwardly depending upon the spring tension exerted upon the holding ball 124.

To shift the clutch and brake assembly from the circular to the elliptical scan position the speed of rotation must be reduced from the motor speed to a stop position. Brake mechanism therefor comprises two arms 130 semicircular in shape and each mounted on a pivot 131 at one end to swing on a block 132 secured by screws 133 to the casing 70, this end of the arm being forked to embrace a portion of the block. At the other end of each arm is a forked extremity in which a roller 134 is mounted on a bearing pin 136. Between the rollers 134 of the arms is a brake operating wedge 137 mounted on a rotatable shaft 138 and having a wide portion 139 to move the rollers apart and a reduced wedging portion 140 allowing the brake arms to be drawn toward each other by means of a coil spring 141 attached at its ends to pins 142 projecting from each of the arms. At the inner edge of each arm is a brake shoe 144 adapted to engage a portion of the periphery of the flange 111 when the clutch assembly is moved toward the plate 74 to assume the elliptical scan position.

The shifting yoke 94 has a central sleeve 146 secured to a shaft 148 mounted in the housing 70 at the side opposite but parallel to the shaft 138 to which the brake operating wedge 137 is secured. These two shafts are each mounted in two bearing sleeves 150 extending through the wall of the casing with the yoke sleeve 146 and the wedge 137 at the inside of the casing and the ends of the shafts extending to the outside of the casing.

To the end of shaft 138 a bell crank 151 is attached at its apex and to the end of shaft 148 an arm 152 is attached at one end by its hub 153. The other end of the arm 152 has a longitudinal slot 154 therein which overlies the bell crank and a pin 155 secured to the bell crank projects through the slot 154. A coil spring 156 is connected at one end to the outer end of the pin 155 and at its other end to a projection at the outer end of the shaft 148. This spring tends to pull the bell crank in a direction to connect the clutch to the collar 77 to obtain a circular scan movement.

At the other end of the bell crank is a projection 157 which extends through an opening in a connector 158 held thereto by a washer 159 and a cotter pin 160 and to which the extremity of a stiff operating cable wire 162 is attached. This wire extends through a leader 164 in the side of the casing 11, and may be operated from a close or a remote position by moving the wire in one direction or the other. When the wire is pulled outwardly the bell crank is rocked and the arm 152 is swung from the position shown in FIG. 1, correspondingly rocking the shafts 138 and 148. Rocking the shaft 148 rocks the yoke 94 and the feet 93 engaging in the clutch groove 92 moves the clutch flange 111 within the brake arms 130; rocking the shaft 138 turns the wedge 137 from the wide portion 139 to the reduced wedging portion 140 which allows the application of the spring 141 to draw the brake shoes 144 against the outside of the brake flange 111.

Figure 2:
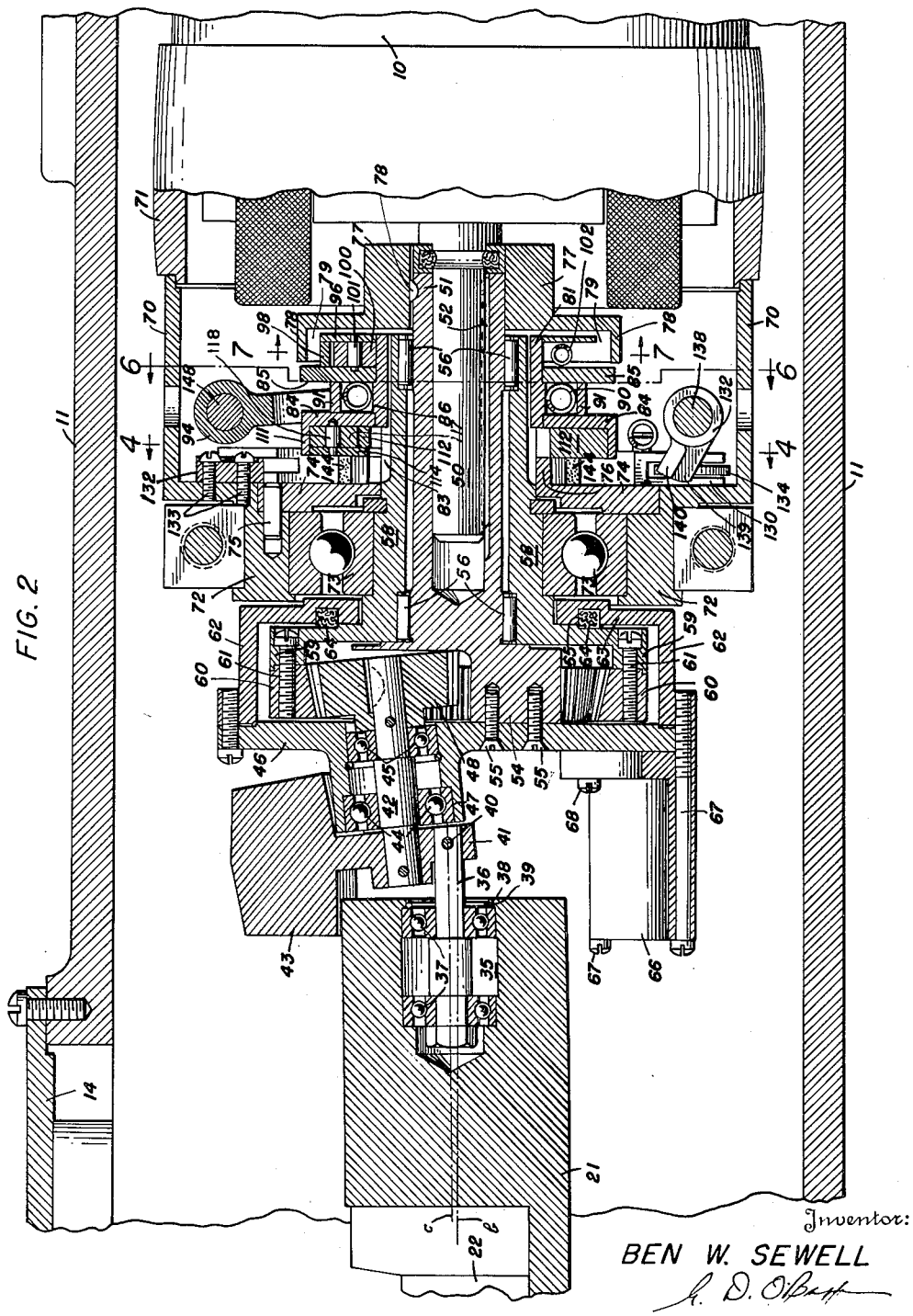
FIG. 2 is a plan section of the nutator mechanism taken on the line 2—2 of FIG. 3.
Figure 3:
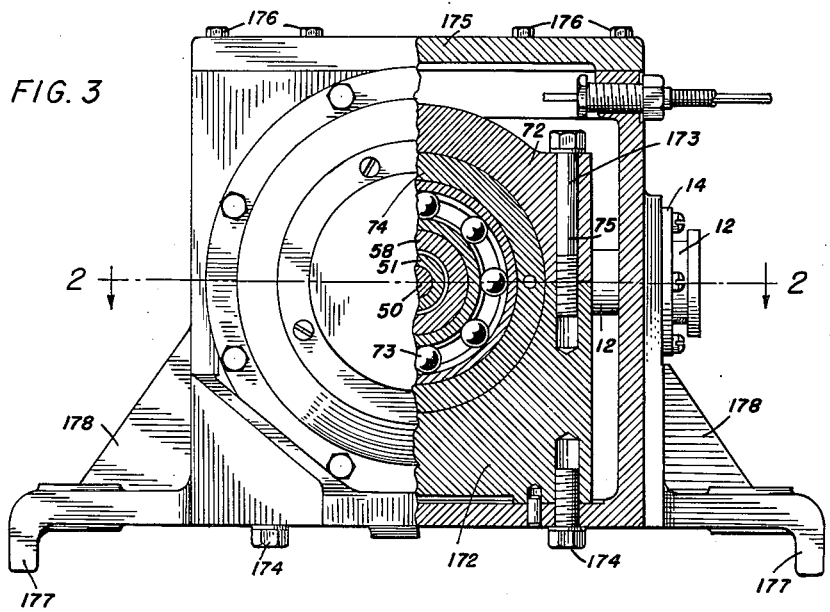
FIG. 3 is an end elevation partly in section of the motor end as shown in FIG. 7.
Figure 4:
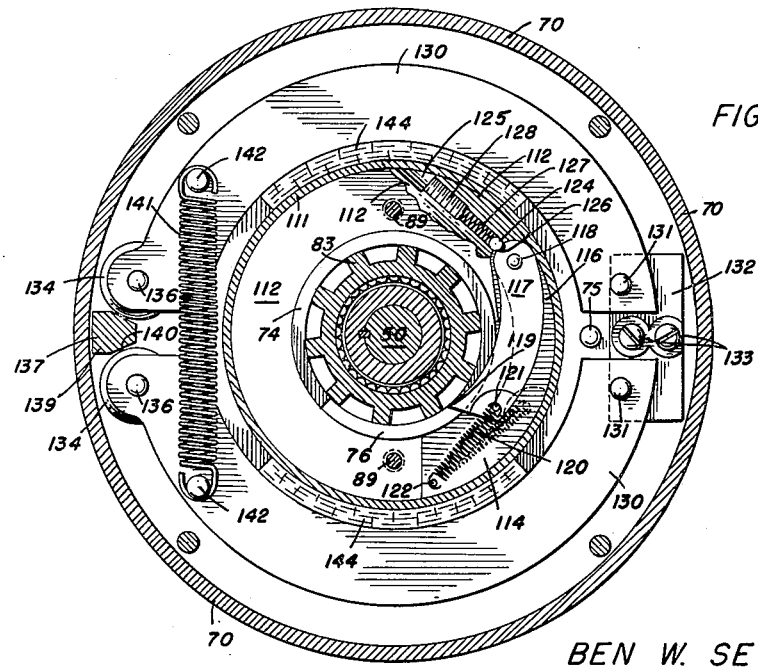
FIG. 4 is a cross sectional view taken on the line 4—4 of FIG. 2; when the brake is applied.

The axis of shaft 50 is in alignment b with the center a of the spherical bearing for the wave guide, and the shaft 36 is slightly inclined to this alignment as indicated by the broken center line c as shown in FIGS. 1 and 2. This constitutes a minimum amplitude for the circular scan. By adjusting the angle of the center line of the shaft 42 so that when extended it passes through the center a of the spherical bearing, there is then no relative longitudinal movement between the shaft 36 and the driving arm 41 while the unit is operating.

The force exerted by the driven end of the antenna feed assembly about the pinion shaft 42 as a center of rotation is counterbalanced by the counterweight 43 on the driving arm. The center of percussion, or point of inertial balance of the feed assembly is located at the center of the spherical bearing. Dynamic balancing of the unit is accomplished since the radial force acting on the pinion shaft 42, as the whole assembly rotates about the motor shaft, is counterbalanced by counterweight 66.

In mounting the mechanism, the bearing ring 72 is attached to a lower bearing base 172 in the casing on a horizontal split line and bolts 173 secure these parts together. The base is secured in the casing 11 by the studs 174 inserted through the bottom. The casing is shown as substantially rectangular with a flat top 175 secured thereto by the studs 176. At one end are outwardly and downwardly projecting feet 177 with end strengthening ribs 178 and fastening perforations 179.

Thus to obtain a circular scan the clutch and brake assembly is moved to lock the arm 41 in a fixed position with relation to the housing plate 46, so that the shaft 36 is driven in a circular path. This is accomplished by engaging the two dogs 100 with the stops 80 of the flange 78 fixed to the collar 77 when the dogs are thrown outwardly by centrifugal force. When the clutch assembly is stationary these dogs 100 are held inwardly out of engagement as shown in FIG. 7. As the clutch assembly is accelerated by frictional engagement of the parts, the centrifugally operated dogs permit the speed of the clutch to approach that of the collar 77 before engaging it, thus reducing the shock of the engagement of the stops 80 which is partially taken up by the shock absorber springs 90. The amplitude of the circular scan may depend upon the position of the arm 41 relative to the internal gear 60 at the time the dogs 100 engage the stops 80.

To obtain an elliptical scan the internal gear 60 is held stationary so that the pinion gear 48 may walk around the internal gear as the housing 62 is driven by the motor. The arm 41 will drive the shaft 36 in an elliptical path which is also modified by the eccentric relation of the shaft 36 due to its connection to the arm 41.

With this construction the beam of a radar unit may be caused to follow either an elliptical or a circular scan and may be rapidly shifted from one position to the other while the motor is running without changing the motor speed. The shifting linkage as described will automatically return the mechanism for a circular scan, but the shifting wire may be held to maintain the mechanism in condition to obtain an elliptical scan.

While a preferred construction is described in detail, it should be regarded as in illustration or example and not as a restriction or limitation, as many changes may be made in the construction, combination, and arrangement of the parts without departing from the spirit and scope of the invention.

I claim:

1. A scanning nutator comprising an antenna feed assembly, a spherical bearing for mounting one end of the assembly, a driving motor having its shaft in alignment with the bearing, an oscillation shaft at the other end of the assembly, a rotatable arm to engage the oscillation shaft and having an axis line at an angle to the alignment centerline and passing through the spherical bearing center, a bearing shaft for said arm having an axis which passes through the spherical bearing center, and means to connect the motor shaft for driving the arm to rotate with the motor shaft and to swing the arm relatively to the motor shaft to move the oscillation shaft in an elliptical path.

2. In a scanning nutator for an elliptical path, comprising an antenna feed assembly with a spherical bearing at one end; an oscillation shaft engaging the assembly at the other end, a motor having a driving shaft in alignment with the center of the spherical bearing; means for supporting the oscillation shaft comprising an arm, a pinion; a shaft for connecting the arm and pinion; an internal gear for engaging the pinion; means connected with the motor shaft for rotating the oscillation shaft and the supporting means therefor; and stop means connected with the driving shaft for holding the internal gear while the pinion supporting means is rotated.

3. In a scanning nutator, an antenna feed assembly with a spherical bearing at one end, an oscillation shaft at the other end; supporting means for the shaft comprising an arm, a shaft with which the arm is rotatable and means to support the last named shaft eccentric to the axis of the assembly; a motor, means to rotate the said supporting means; clutch mechanism connected between the motor and said last mentioned means and a weight rotatable with the motor to counteract the supporting means.

4. In a scanning nutator, an antenna feed assembly with a spherical bearing at one end, an oscillation shaft at the other end; supporting means for the shaft comprising an arm, a shaft upon which the arm is rotatable, means to support the last named shaft eccentric to the axis of the assembly, and a counter balance weight on the arm at the end opposite the oscillation shaft; a motor having a drive shaft in alignment with the spherical bearing; means connected with the motor shaft for rotating said supporting means and the oscillation shaft about the drive shaft axis to obtain a circular scan; a counter weight carried by said means connected with the motor shaft opposite the counter balance weight on said arm; and means to connect the motor shaft for rotating said supporting means with the shaft eccentric to the assembly axis to obtain an elliptical scan.

5. In a scanning nutator, an antenna feed assembly mounted to oscillate in a spherical bearing, a motor bearing a driving shaft in alignment with the spherical bearing, means to engage one end of the feed assembly for oscillating it in said bearing and comprising an internal gear and a pinion meshing therewith having its axis at an angle to the motor shaft axis but to pass through the center of the spherical bearing, a weighted arm to rotate with the pinion about the axis thereof to obtain an elliptical scan, means to connect the pinion and the weighted arm for rotation with the motor shaft to obtain a circular scan, and a counterweight rotatable with the motor shaft opposite the weighted arm and producing thereby a dynamic balance of the motor rotated feed assembly.

6. In a scanning nutator, an antenna feed assembly mounted to oscillate in a spherical bearing, a motor having a driving shaft in alignment with the spherical bearing, means to engage one end of the feed assembly for oscillating it in said bearing and comprising an internal gear and a pinion meshing therewith, a mounting sleeve for the internal gear rotatable about the motor shaft, a stop plate within which the sleeve is rotatable, a collar carried by the motor shaft at one end of the sleeve, a clutch splined to the sleeve having means at one end to engage the stop plate and means at the other end to engage the collar, and means to move the clutch in opposite directions to engage either the stop plate or the collar.

7. In a scanning nutator, an antenna feed assembly and a spherical bearing in which it is mounted for circular and elliptical oscillation, a motor having a rotatable shaft, oscillating means comprising a pinion and an internal gear engaged thereby, a support extending along the shaft for mounting the gear concentric with the shaft, a stop plate near the gear, a collar connected to the shaft, and a clutch movable lengthwise of the support between the plate and the collar having means at one end to engage the stop plate and means at the other end to engage the collar.

8. In a scanning nutator, an antenna feed assembly and a spherical bearing in which it is mounted for circular and elliptical oscillation, a motor having a rotatable shaft, oscillating means comprising a pinion and an internal gear engaged thereby, a sleeve extending along the shaft having a projection at one end mounting the gear concentric with the shaft, a stop plate fixed near the gear end of the sleeve, a collar connected to the shaft at a distance from the stop plate, a clutch comprising a spline sleeve movable lengthwise on the other sleeve, stop means mounted on the spline sleeve and movable to engage the stop plate at one end or the collar at the other end, and shock absorbing means between the spline sleeve and the said stop means.

9. In a scanning nutator, an antenna feed assembly mounted to oscillate in a bearing, means including a driving motor to oscillate the assembly, means including a driving collar connected to the motor to actuate the assembly to obtain a circular scan, means including a stop plate to modify the motor movement of the assembly for obtaining an elliptical scan, clutch means to connect the motor quickly to the feed assembly to produce either scan without stopping the motor, and resilient shock absorbing means for cushioning the clutch means and the driving motor when a circular scan is obtained and between the clutch means and the stop plate when an elliptical scan is obtained, in changing from one scan to the other.

10. In a scanning nutator, an antenna feed assembly and means mounting it to obtain a circular scan and other means to obtain an elliptical scan, a driving motor for oscillating the assembly in either scan path, a shiftable clutch assembly for quickly connecting the motor to oscillate the feed assembly in one path or the other without stopping the motor, shock absorbing means in the clutch assembly to cushion the impact between the driving motor and the clutch assembly and brake mechanism to retard and stop the clutch assembly in obtaining the elliptical scan.

11. In a scanning nutator, an antenna feed assembly mounted to oscillate in a bearing, means including a driving motor to oscillate the assembly, means including a driving collar connected to the motor to actuate the assembly to obtain a circular scan, means including a stop plate to modify the motor movement of the assembly for obtaining an elliptical scan, clutch means to connect the motor quickly to the feed assembly to produce either scan without stopping the motor, the clutch means being rotatable with the motor driven collar to obtain a circular scan and being engageable with the stop plate to obtain an elliptical scan, and brake means applicable to stop the rotatable clutch.

12. In a scanning nutator, an antenna feed assembly, means comprising an interior gear and a pinion meshing therewith to oscillate the assembly to obtain a circular scan when the gear is rotated and an elliptical scan when the gear is held against rotation, a motor for driving the assembly in either path, shiftable clutch mechanism to connect the gear for rotation by the motor and to disconnect it therefrom, brake mechanism forming a part of the clutch mechanism and operable to stop the rotation of the gear and the clutch mechanism when disconnected from the motor, and latch means to hold the interior gear against rotation after it is disconnected from the motor and stopped by the brake mechanism.

13. In a scanning nutator, an antenna feed assembly, means comprising a pinion connected with the assembly and an internal gear meshing therewith and mounted on a rotatable sleeve for oscillating the assembly to obtain a circular scan when the sleeve is rotated and an elliptical scan when the gear and sleeve are held against rotation, a motor and a collar driven thereby at one end of the sleeve, a stop plate surrounding the sleeve near the gear end, rotatable clutch mechanism shiftable on the sleeve having dogs at opposite ends to engage either the collar to rotate the sleeve with the motor or to engage the stop plate for holding the sleeve and the gear in stationary position, brake arm means to engage the clutch mechanism when it is shifted to disengage the dogs from the collar, and brake and clutch operating means comprising a yoke engageable with the clutch and a brake operating wedge to release the brake arms for engaging the clutch and stopping the rotation thereof.

14. In a scanning nutator, an antenna feed assembly, means comprising a pinion connected with the assembly and an internal gear meshing therewith and mounted on a rotatable sleeve for oscillating the assembly to obtain a circular scan when the sleeve is rotated and an elliptical scan when the gear and sleeve are held against rotation, a motor and a collar driven thereby at one end of the sleeve, a stop plate surrounding the sleeve near the gear end, rotatable clutch mechanism shiftable on the sleeve having a spline sleeve with spaced projections around its mid-portion, a disk freely mounted at each side of the projections on the spline sleeve, blocks connected between the disks and alternated with said projections, coil springs between each block and projection, a ring cover extending between the disks and over the blocks and projections to hold the springs between them, and dogs operated by centrifugal force to engage the collar to engage the stop plate, the springs cushioning the change of movement of the disks relative to the spline sleeve.

15. In a scanning nutator, an antenna feed assembly mounted to oscillate in a bearing, means including a driving motor to oscillate the assembly, means including a driving collar connected to the motor to actuate the assembly to obtain a circular scan, means to modify the motor movement of the assembly for obtaining an elliptical scan, clutch means to connect the motor quickly to the feed assembly to produce either scan without stopping the motor, and clutch shifting means comprising a yoke engaging the clutch means, a shaft for rocking the yoke, an arm and lever connection for rocking the shaft in opposite directions, and spring means tending to rock the shaft and the yoke to move the clutch means to obtain a circular scan.

References Cited in the file of this patent

UNITED STATES PATENTS

| | | |
|---|---|---|
| 1,141,972 | Muhleman | June 8, 1915 |
| 2,170,733 | Sharpe | Aug. 22, 1939 |
| 2,410,831 | Maybarduk et al. | Nov. 12, 1946 |
| 2,412,867 | Briggs et al. | Dec. 17, 1946 |
| 2,457,417 | Trautmann | Dec. 28, 1948 |
| 2,457,562 | Karleen | Dec. 28, 1948 |
| 2,464,394 | Herzlinger | Mar. 15, 1949 |
| 2,498,056 | Werner | Feb. 21, 1950 |
| 2,528,963 | Looney | Nov. 7, 1950 |